June 18, 1963     S. GONDEK     3,094,107
PUSH ROD STRUCTURE
Filed July 15, 1960     2 Sheets-Sheet 1
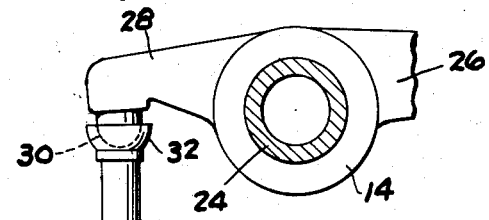
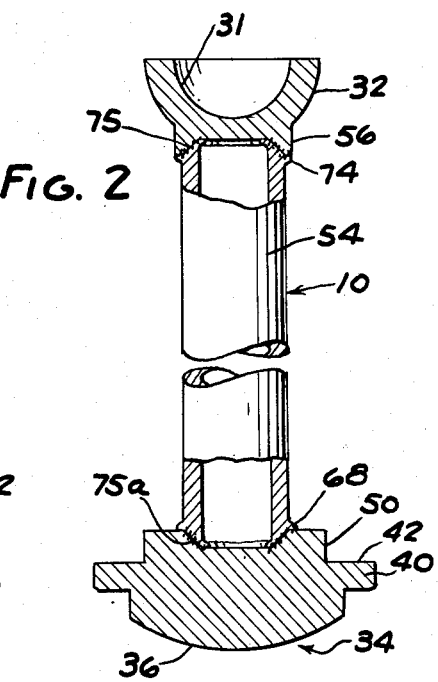
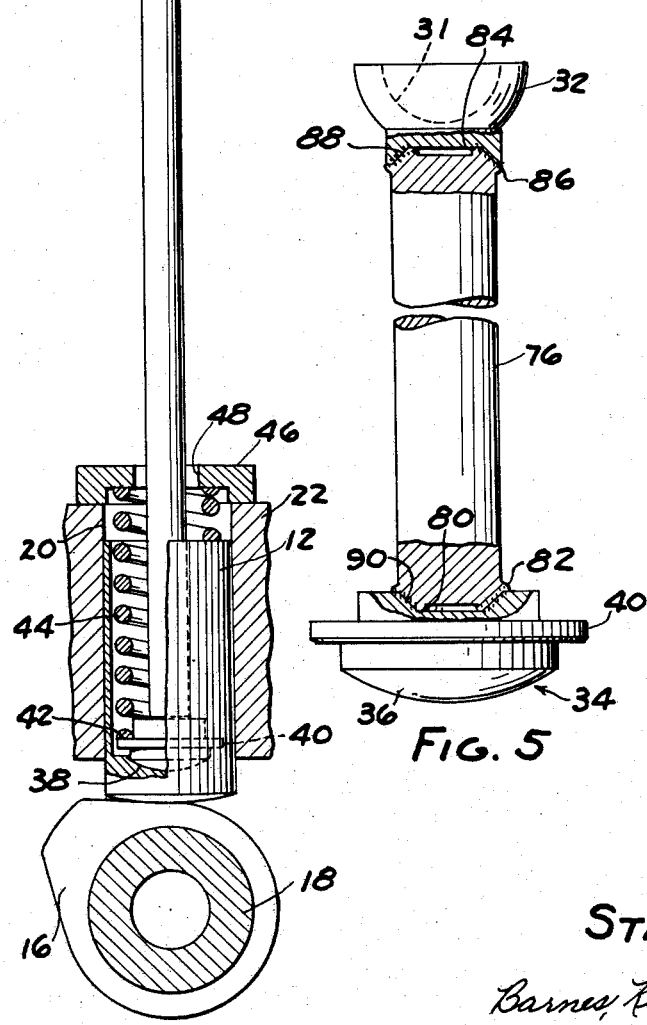
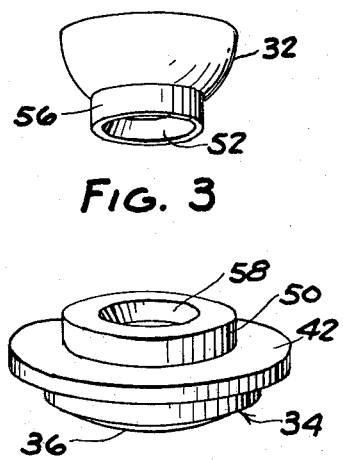
INVENTOR.
STANLEY GONDEK
BY
Barnes, Kisselle, Raisch & Choate
ATTORNEYS

United States Patent Office 3,094,107
Patented June 18, 1963

3,094,107
PUSH ROD STRUCTURE
Stanley Gondek, Birmingham, Mich., assignor to Bundy Tubing Company, Detroit, Mich., a corporation of Michigan
Filed July 15, 1960, Ser. No. 43,219
5 Claims. (Cl. 123—90)

This invention involves push rods of the type which interconnect moving parts of a mechanism, particularly where one or more of the interconnected parts has a rocking or rotary component of motion. Selected for illustration of the invention is a valve train in an internal combustion engine.

Heretofore, push rods having tubular bodies have been successfully made on a commercial scale by welding the ends of tubes to end pieces having pre-formed bearing surfaces for engagement with other parts of a mechanism. See my co-pending application, Serial No. 8,331 entitled Push Rod Structure and Method of Manufacture, filed February 12, 1960, now Patent No. 3,050,045, and the co-pending application of Edward O. Burnard et al., Serial No. 770,496 entitled Push Rod and Method of Its Manufacture, filed October 29, 1958, now Patent No. 2,960,080. However, it has not been economically feasible heretofore to manufacture push rods for ordinary purposes on a high volume scale by welding solid rods to end pieces having pre-formed bearing surfaces, nor to weld solid rods or tubular rods selectively to an end piece.

The objects of this invention are to provide a rapid, relatively inexpensive, improved method of manufacturing push rods having bodies formed either of tubular or solid rods and to provide a simple, inexpensive improved push rod structure.

Generally, the invention contemplates a solid or tubular rod with a peripheral edge or ridge adjacent its end, and an end piece with a recess into which the end of the rod is inserted, the recessed surface engaging the ridge on a generally line contact to facilitate initiation of a resistance welding. The recessed surface is angled to the rod axis to progressively broaden the region of contact under the welding heat and pressure and increase the weld area to provide a very strong welded joint between the rod and the end piece which provides the bearing surface.

In the drawings:

FIG. 1 is a view partly in elevation and partly in section illustrating a push rod according to this invention in use.

FIG. 2 is an enlarged view of the push rod with portions broken away at its ends to illustrate structure.

FIG. 3 is an enlarged perspective view of one form of end piece separate from the rod.

FIG. 4 is an enlarged perspective view of another form of end piece separate from the rod.

FIG. 5 is a view similar to FIG. 2 but showing a rod body in the form of a solid rod rather than a tubular rod.

Figure 6:
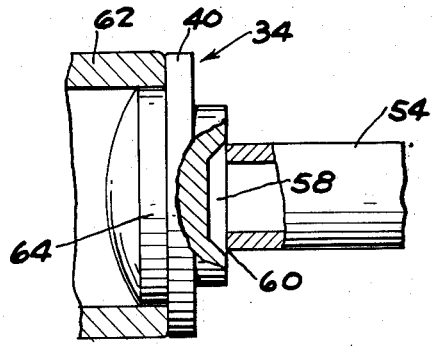
FIG. 6 is a fragmentary partially sectional view illustrating a step in manufacture of the push rod.

Shown in FIG. 1 is a push rod 10 according to this invention operably interconnecting a cup-shaped valve lifter 12 and a valve operating rocker 14. Lifter 12 is raised and lowered by a cam 16 on a cam shaft 18 and the lifter moves in a guide 20 formed in engine block 22. Rocker 14 is mounted on a shaft 24 with one arm 26 operably engaged with a valve (not shown) and with another arm 28 on the opposite side of shaft 24 engaged with the push rod. Arm 28 has a projection with a spherical surface 30 engaged within a complementary spherical concavity 31 in a cup-shaped end piece 32 at one end of the push rod.

The other end of the push rod is provided with an end piece 34 having a spherical surface 36 bearing against a complementary spherical concave surface 38 in the bottom of cup-shaped valve lifter 12. End piece 34 has a radial flange 40, one face 42 of which forms a seat for engagement by an end of a coil spring 44 which is compressed to bias surface 36 against seat 38. Spring 44 re-acts against a retainer 46 secured by suitable means (not shown) to engine block 22 and having a central opening 48 through which the push rod extends. End piece 34 has a cylindrical portion 50 extending longitudinally away from face 42 and serving as a pilot or positioning means for centering the end of the coil spring with respect to face 42.

End piece 32 is provided with a recessed surface 52 which is welded to an end of a tube 54 forming the push rod body and in the form of the invention illustrated, recessed surface 52 is generally conical and is contained within a cylindrical portion 56 projecting from the cup portion of end piece 32. End piece 34 is also provided with a recessed surface 58 contained in cylindrical projecting portion 50, this surface also being illustrated as generally conical and being welded to the other end of tube 54 in a manner to be described.

End pieces 32 and 34 are preferably formed of a relatively hard material such as a case hardened steel and may be conveniently formed by cold forging. By this means exposed surfaces 31 and 36 provide hard, smooth bearing surfaces for engagement with rocker arm projection 30 and valve lifter seat 38 respectively.

The tubular push rod body 54 has open ends prior to the time when end pieces 32 and 34 are secured thereto. The illustrated round sectional shape of the tube is suitable for most purposes and facilitates economical manufacture. The tube may be of any suitable rigid type such as an extruded seamless tube or a rolled plural or single ply tube and may be made of any suitable material such as ferrous metal which will give it requisite rigidity and which is capable of being resistance welded to the end pieces. An example of a suitable tube is a single ply rolled steel tube having a butt welded longitudinal seam.

According to the invention, end pieces 32 and 34 are welded to the ends of the tube. Preparatory to the welding, the end portion of the tube is provided with a peripheral edge or ridge 60 for engagement on a generally line contact with the recessed surface 52 or 58 of the end piece to which the tube end is to be welded. For this purpose, the tube end may conveniently be cut off square to provide a continuous curved ridge or edge at its very end. In the drawings edge 60 is circular since the tube end face is generally perpendicular to the longitudinal axis of the tube.

Figure 7:
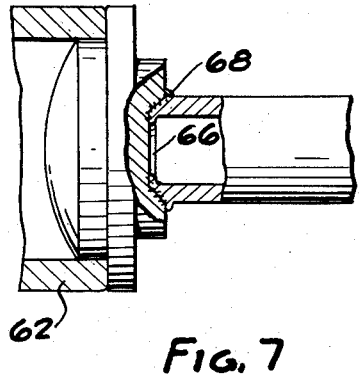
FIG. 7 is a view similar to FIG. 6 illustrating a subsequent step in manufacture of the push rod.
Figure 8:
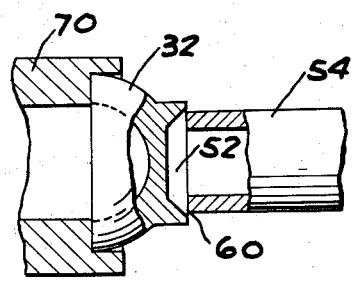
FIGS. 8 and 9 are similar to FIGS. 6 and 7 but illustrate successive steps in the manufacture of a push rod having a different form of end piece.

End piece 34 is welded to one end of tube 54 by the steps illustrated in FIGS. 6 and 7. The tube and end piece are first oriented with their axes substantially in alignment so that the tube end is positioned for insertion into conical opening 58. This may be done by supporting the end piece in an electrode 62 which engages around a cylindrical portion 64 of the end piece and abuts flange 40. Tube 54 is gripped in a suitable electrode (not shown). Electrodes 62 and tube 54 are then advanced toward each other so that the end of the tube is inserted within conical opening 58 and annular ridge 60 engages against the conical surface which extends at a non-perpendicular angle to the longitudinal extent of the tube. Welding current is now passed between tube 54 and end piece 34 while the force urging the tube and end piece toward each other is continued to effect the welding.

During the welding, the walls defining the end of the tube are softened and end piece 34 and tube 54 move toward each other to the general condition illustrated in FIG. 7 wherein the tube walls adjacent its end are flared inwardly and outwardly, thus increasing the width of the weld and providing a very sturdy joint between the end piece and tube when the welded portions are cooled. Fillets formed during the welding are illustrated at 66 and 68.

Figure 9:
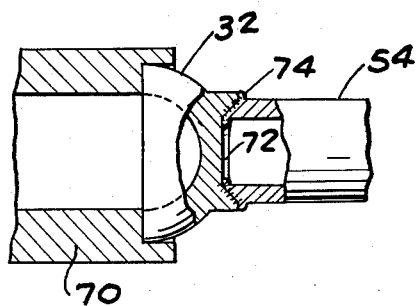
Figure 10:
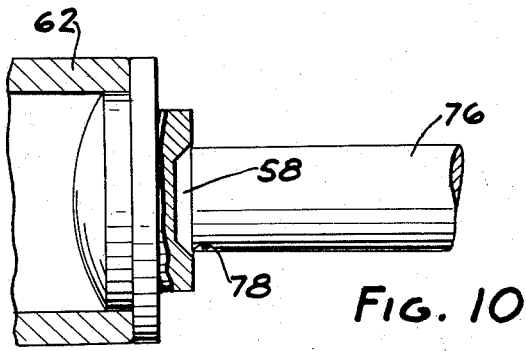
FIG. 10 is a fragmentary partially sectional view illustrating a step in manufacture of a push rod having a solid rod body.

End piece 32 is welded to an end of the tube by a similar process except that a different form of electrode 70 is used for supporting end piece 32 and applying welding current and welding pressure. Here again, the tube end is inserted into conical opening 52 and engaged against the conical surface defined thereby, the welding current and pressure causing formation of the weld shown in FIG. 9 with thickening of the tube walls and formation of fillets 72 and 74.

In the completed structure, rod 10 has end portions 75 and 75a defining seats, each extending at a non-perpendicular angle to the longitudinal extent of the rod and these seats are welded directly to recessed surfaces 52 and 58 respectively.

The push rod body may comprise a solid rod 76 as distinguished from a tubular rod as illustrated in FIG. 5. The ends of the rod are welded to end pieces 32 and 34 in a manner similar to the welding described above. The end of the rod is provided with a peripheral ridge or edge of a slightly smaller diameter than conical opening 52 or 58 in the end piece to which it is to be welded. The end piece and rod are oriented with their axes substantially aligned and the end of the rod is inserted into the conical opening so that its ridge 78 engages the surface defined by the opening. The welding pressure and current are then applied with progressive softening and thickening of the metal in the weld region to the condition illustrated in FIG. 5, fillets 80 and 82 being formed during the welding. End piece 32 is welded to the other end of the rod by a similar method with the formation of fillets 84 and 86.

In the completed structure, rod 76 has end portions 88 and 90 defining seats, each extending at a non-perpendicular angle to the longitudinal extent of the rod and these seats are welded directly to recessed surfaces 52 and 58 respectively.

The invention thus facilitates the manufacture of push rods by welding end pieces to the ends of a rod body which may be either tubular or solid as required. The welded connections are very strong and are subject to minimal failure in use. The process of manufacture is both rapid and inexpensive since machining operations are minimized or completely eliminated. Bearing surfaces 31 and 36 and recessed surfaces 52 and 58 are provided by cold forging of the metal forming the end pieces. Ridges 60 and 78 on the tube and rod respectively are provided by ordinary cut off procedures.

It is possible to deviate from the illustrated round sectional shape of tube 54 and rod 76 and if this is done, it may or may not be desirable to modify the shape of recessed surfaces 52 and 58. The important thing is that the tube or rod end be provided with ridge or edge portions and that the end piece be provided with a recessed portion so that when the ridge portions are engaged against the recessed surface the recessed surface extends at an angle to the longitudinal extent of the tube or rod. By this means, the point or line engagement of the ridge portions with the recessed surface facilitates initiation of the resistance welding while the angled surface provides for progressive thickening of the weld area to form a sturdy weld between the tube or rod and end piece.

The specific shape of end pieces 32 and 34 are illustrative only and they may have other forms to provide bearing surfaces and other structural features such as flange 40 in accordance with the individual requirements of the mechanism in which the push rod is to be used.

I claim:
1. Push rod structure comprising,
a rod having an end portion defining a seat having portions disposed at a non-perpendicular angle to the longitudinal extent of said rod,
and end piece having one end portion with a diameter larger than that of said rod, said one end portion having a recess with a first inner surface portion disposed at a non-perpendicular angle to the longitudinal extent of said rod,
a weld connection connecting said seat portions directly to said first inner surface portion,
said recess having a second inner surface portion contiguous to the first and being disposed immediately adjacent the very end of said rod,
the exterior surfaces of said one end portion of said end piece extending generally axially of said rod beyond said very end thereof,
said end piece having an intermediate portion extending across said very end of said rod, one side of which comprises said second inner surface portion of said recess,
said end piece having another end portion with an exposed rounded surface forming a bearing surface adapted for engagement with a part of a mechanism with which said push rod is adapted to be used,
said rounded surface terminating at a shoulder displaced from said very end of said rod and having a radius of curvature which is independent of the diameter of said rod.

2. The combination defined in claim 1 wherein said rod adjacent said end thereof is tubular.

3. The combination defined in claim 2 wherein said rod is tubular throughout its length.

4. The combination defined in claim 1 wherein said rod adjacent said end thereof is solid as distinguished from tubular.

5. Push rod structure comprising,
a rod having an end portion,
and end piece having a generally cylindrical end portion with a diameter larger than the general diameter of said rod,
said cylindrical portion having a recess within which the end portion of said rod is disposed,
said recess and rod having surfaces which are directly welded together in a weld region disposed at a non-perpendicular angle to the longitudinal extent of said rod,
said cylindrical portion including a portion extending transversely across the very end of said rod and defining a cap, said transversely extending portion being contiguous to said weld region and immediately adjacent said very end,
said end piece having portions integral with said cap extending axially away from said very end of said rod,
the latter said portions of said end piece including a rounded surface forming a bearing surface adapted for engagement with a part of a mechanism with which said push rod is adapted to be used,
said rounded surface terminating in a shoulder and having a radius of curvature which is independent of the diameter of said rod.

References Cited in the file of this patent

UNITED STATES PATENTS

| | | |
|---|---|---|
| 1,823,419 | Almen | Sept. 15, 1931 |
| 2,223,730 | Ledig | Dec. 30, 1940 |
| 2,735,313 | Dickson | Feb. 21, 1956 |
| 2,743,712 | Hulsing | May 1, 1956 |
| 2,755,368 | Wirt et al. | July 17, 1956 |
| 2,903,564 | Carr | Sept. 8, 1959 |
| 2,975,775 | Macura | Mar. 21, 1961 |

FOREIGN PATENTS

| | | |
|---|---|---|
| 714,647 | Great Britain | Sept. 1, 1954 |